United States Patent [19]
Kulakowski et al.

[11] Patent Number: 5,303,219
[45] Date of Patent: Apr. 12, 1994

[54] RECLAMATION OF DUST CONTAMINATED SECTORS IN OPTICAL DISK APPARATUS

[75] Inventors: John E. Kulakowski; Rodney J. Means, both of Tucson, Ariz.

[73] Assignee: International Business Machines Corporation, Armonk, N.Y.

[21] Appl. No.: 756,729

[22] Filed: Sep. 9, 1991

[51] Int. Cl.⁵ .................................................. G11B 7/00
[52] U.S. Cl. ........................................ 369/54; 369/48; 369/56; 369/58; 369/50
[58] Field of Search .................... 369/54, 48, 59, 58, 369/32, 56, 50, 47; 360/48, 128, 137

[56] References Cited

U.S. PATENT DOCUMENTS

| | | | |
|---|---|---|---|
| 4,216,541 | 8/1980 | Clover et al. | 371/58 |
| 4,363,117 | 12/1982 | Wine | 369/43 |
| 4,434,487 | 2/1984 | Rubinson et al. | 360/53 |
| 4,506,362 | 3/1985 | Morley | 371/13 |
| 4,916,703 | 4/1990 | Christensen et al. | 371/51.1 |
| 4,926,408 | 5/1990 | Murakami et al. | 369/58 |
| 4,949,326 | 8/1990 | Takagi et al. | 369/53 |
| 5,111,444 | 5/1992 | Fukushima et al. | 369/59 |

FOREIGN PATENT DOCUMENTS 0350920 1/1990 European Pat. Off. .
0357049 3/1990 European Pat. Off. .

OTHER PUBLICATIONS

IBM TDB, vol. 32, No. 6A, Nov. 1989, New York US pp. 319-324 'Erase Detection Of Error Recovery For Optical Files'.

Primary Examiner—Aristotelis Psitos
Assistant Examiner—Nabil Hindi
Attorney, Agent, or Firm—Greenlee and Winner

[57] ABSTRACT

Defective sectors on an optical disk are identified during initial format and such sectors are eliminated as sectors that might possibly be reclaimed at a later date. Those sectors which are identified as defective during use of the disk are listed separately from those found defective at initial format in a secondary defect (SDL) list. After a cleaning operation, those sectors in the SDL are surface analyzed to determine whether they are now good. Further, those defective sectors in the SDL adjacent to sectors found initially defective may be eliminated as reclamation possibilities.

18 Claims, 7 Drawing Sheets

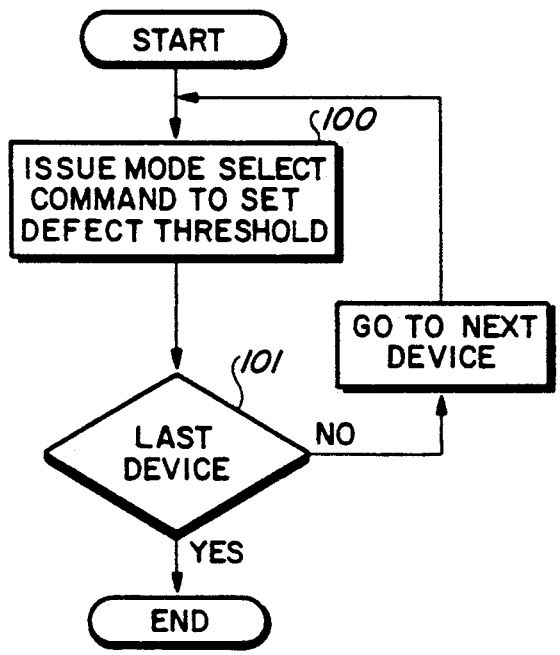
_FIG. 5_
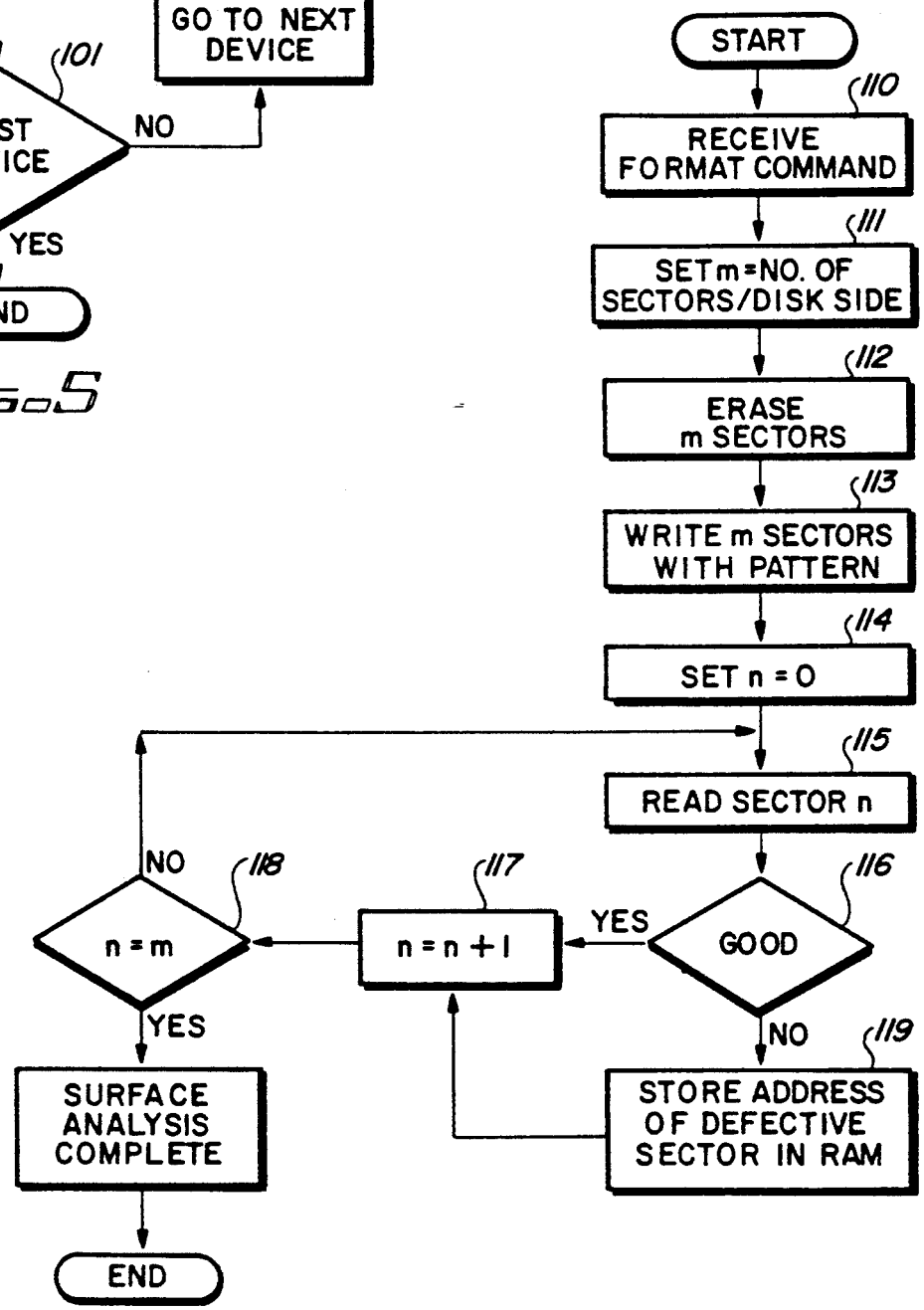
_FIG. 6_

RECLAMATION OF DUST CONTAMINATED SECTORS IN OPTICAL DISK APPARATUS

This invention relates to optical storage apparatus and more particularly to the detection of excessive spare sector consumption due to contamination from dust and recovering of the good sectors after the disk is cleaned.

BACKGROUND OF THE INVENTION

Standard optical disks may be formatted with several thousand spare sectors per surface. The purpose of the spare sectors is to provide locations for recording data when defects in the media or debris on the media create the inability to read and write data. In optical disk technology the marks that are placed on a disk when data is written may be only one micron in size, therefore a small defect or a dust particle on the disk can introduce an error when reading or writing the data.

Defects in optical disks are generally of two types. One type is within the structure of the disk itself while a second type is the result of dust contamination on the surface of the optical disk. Magneto-optical (MO) disks are more subject to manufacturing defects that is, a defect within the structure of the disk, than many other types of media since the MO disks are produced with reactive materials such as terbium, iron and cobalt. If any moisture or oxygen reaches the active layer a defect can result. Such defects may occur during the manufacturing process but they may also arise later during use of the disk.

A defect in reactive material tends to grow during the course of time. The active layers in an MO disk are covered with transparent plastic material designed to be impermeable to oxygen and moisture. If, however, oxygen and moisture reach the active layer a defect may result and may grow. Consequently, if a defect is initially present in the active layer such that one bit of data in one sector is affected, over a period of time that defect may grow to affect additional bits of data in that sector or adjacent sectors.

The second type of defect creating problems in reading and writing data to an optical disk is contamination due to dust or debris. When a particle of dust lights upon the surface of a disk and if the particle is large enough, the laser beam is diffused or blocked by the dust particle and consequently the disk is not written or read at that particular location. Defects created by a dust particle generally do not grow in size but the defect may move across the surface in the course of time as the dust particle moves.

The result of a defect on a disk is the same whether it be a defect in the reactive material or whether it be due to dust. An optical disk system can not know what is causing the defect, only that an error exists. The error may make it impossible to correct data that is written on the disk or make it more difficult to correct the data through error correction codes. It may become necessary for the data to be moved to a spare area. If the problem is caused by dust, it may be that the spare area is also contaminated by dust and thus it becomes necessary to move the data to still another spare area. Contamination due to dust can use up spare areas rapidly.

U.S. Pat. No. 4,506,362 relates to dynamic RAM memory wherein if an error in data is found and corrected utilizing error correcting codes, the data is then rewritten back to the same RAM storage location. If the error repeats itself, it is assumed that a hard error is present within the apparatus. Dynamic RAMS are subject to soft errors, for example, from the bombardment of the RAM by alpha particles and therefore this technique is designed to distinguish hard errors from soft errors.

U.S. Pat. No. 4,916,703 also relates to distinguishing hard errors from soft errors in RAM storage.

U.S. Pat. No. 4,216,541 relates to an error recovery technique in a bubble memory where data is periodically read and errors are detected and corrected. Once corrected the coded data is rewritten back into the memory.

U.S. Pat. No. 4,926,408 relates to optical disk apparatus containing two heads, one for reading and one for writing. Defects are detected during the formatting operation and sectors with defects are then eliminated from all further reference.

U.S Pat. No. 4,434,487 relates to a three layer defect management system in a mass storage disk wherein defective sectors are replaced by spare sectors.

U.S. Pat. No. 4,949,326 relates to optical disks and teaches a defect management system for optical disks wherein defective sectors are replaced by spare sectors.

The inventors herein have recognized that defects on optical disks are of two types, that is they may be a result of a defect in the reactive material or they can be defects which are a result of contamination. Defects in the reactive material may not be removed by cleaning, however, defects due to dust may be eliminated by cleaning the disk.

SUMMARY OF THE INVENTION

Briefly stated, this invention provides a mechanism to distinguish errors caused by dust (temporary defects) from errors caused by defects within the media (permanent defects) and provides mechanisms for reclaiming sectors after cleaning the disk. This is accomplished by noting all defective sectors found during the initial format (permanent defects) and eliminating them as reclamation possibilities. Further, any defective sectors after format time adjacent to those sectors found defective at format time can also be eliminated as reclamation possibilities. Thereafter, during use of the optical disk, once a threshold of spare sector consumption is met, a mechanism notifies the host that spares are becoming scarce and a request is made to ask for a disk cleaning operation. Once cleaned, those sectors which have been identified as potentially reclaimable are then reformatted to determine whether they are now usable. Those sectors identified as reusable are then reclaimed according to one of the three methods: 1) the reclaimed sectors are defined as additional spares; 2) data originally intended for the reclaimed area but written to a spare area are moved back to the reclaimed area in order to free the spare area; and 3) the reclaimed area is restored to the user area for future write operations.

The foregoing and other objects, features and advantages of the invention will be apparent from the following more particular description of the invention, as illustrated in the accompanying drawing.

BRIEF DESCRIPTION OF THE DRAWING

FIG. 5 shows the procedure for setting a threshold beyond which the number of remaining unused spare sectors is indicated as small.

FIG. 6 shows a surface analysis procedure for identifying defective sectors through a format operation.

DETAILED DESCRIPTION

Figure 1:
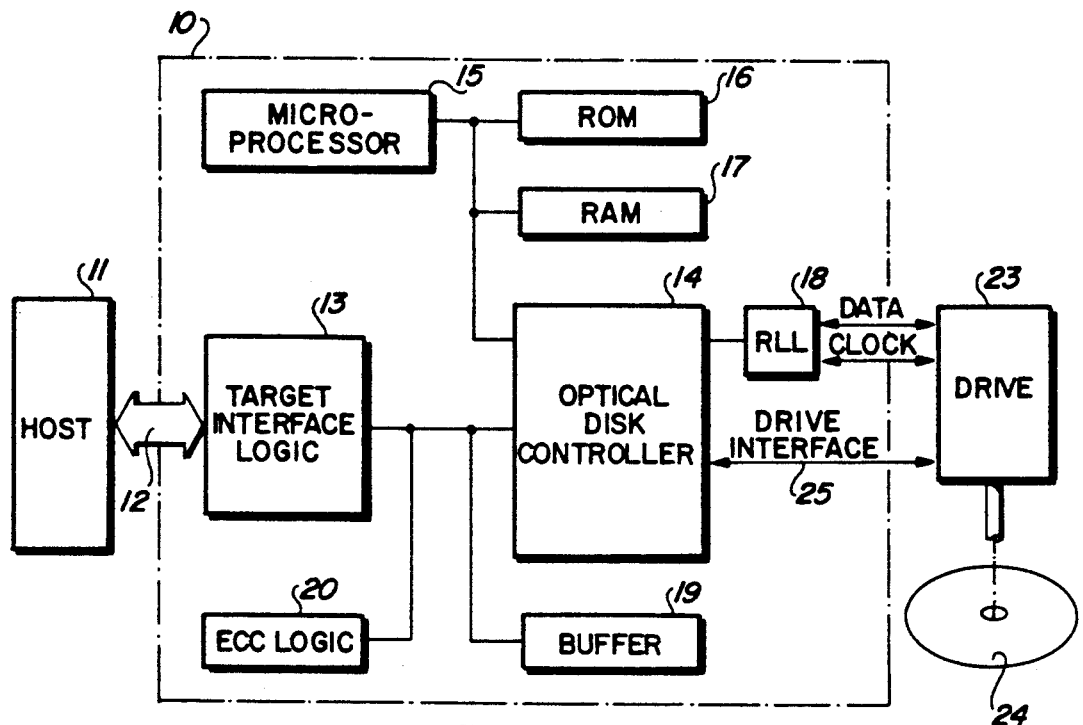
FIG. 1 is a block diagram of a typical system attachment controller for an optical disk drive utilizing the instant invention.

FIG. 1 shows a controller 10 for a peripheral device, in this instance an optical disk drive 23, connected to host processor 11 over bus 12. Controller 10 includes target interface logic 13, an optical disk controller 14 and a microprocessor 15. Read only memory (ROM) 16 and random access memory (RAM) 17 are associated with the microprocessor 15. A run length limited (RLL) circuit 18 passes data to an from the drive 23. A buffer 19 provides storage for data and an error correcting code (ECC) logic circuit 20 provides corrections to the data contained in buffer 19. An optical disk 24 is loaded into drive 23 for writing and reading data to and from the disk.

Microprocessor 15 is the system manager for the controller. It controls the optical disk controller 14 and the drive interface 25. It interprets the commands and monitors the ECC logic through the optical disk controller. The optical disk controller 14 controls the ECC encoding/decoding and the data buffering process. ROM 16 provides for local control storage for the microprocessor 15 while RAM 17 provides working storage to the microprocessor 15. The target interface logic 13 receives commands and data from the host processor over bus 12.

Figure 2:
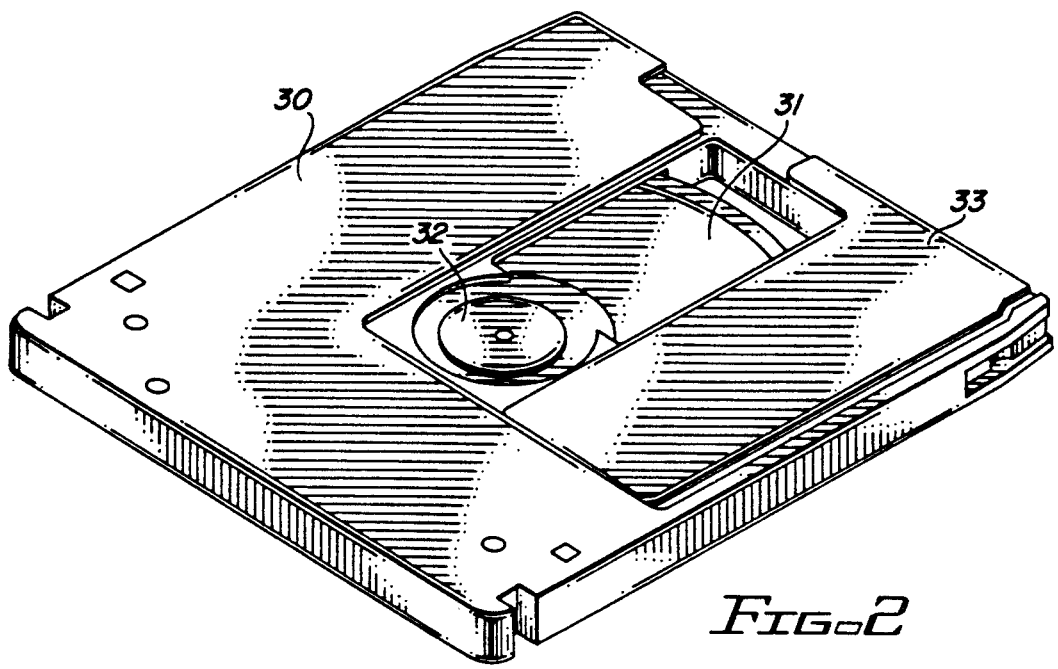
FIG. 2 shows a typical optical disk.

FIG. 2 shows an optical disk for use in a disk drive controlled by the controller shown in FIG. 1. A cartridge 30 contains an optical disk 31 mounted on a hub 32. A shutter door 33 on the cartridge is shown in an open position so as to reveal the disk 31. When in its closed position, dust does not have access to the disk, but when the cartridge is open as it must be for a read/write head to access data on the disk 31, dust may contaminate the surface of the disk.

Figure 3:
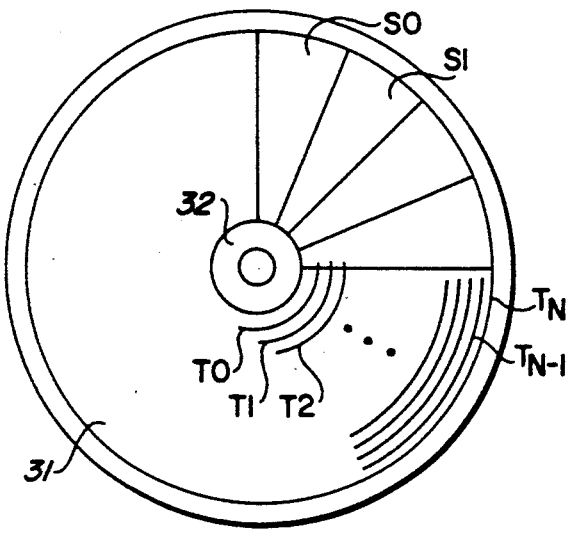
FIG. 3 is a schematic showing of the optical disk of FIG. 2 with tracks and sectors.

FIG. 3 shows a schematic layout of optical disk 31 with tracks and sectors. Track zero, T0, is shown as the innermost track on disk 31 and is located close to disk hub 32. Tracks proceed from the innermost location to an outermost track, Tn. Tracks may be concentric to each other but in optical disk technology it is common to provide tracks in a continuous spiral. The disk is logically divided into sectors such as sector zero, S0, and sector one, S1, shown in FIG. 3. It is common practice to provide 17 equal sectors around the periphery of a disk.

Figure 4A:
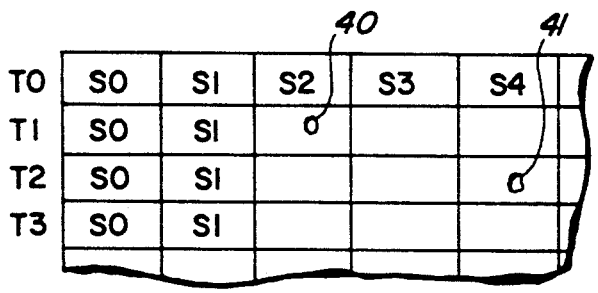
FIG. 4 comprised of FIGS. 4A and 4B is a diagrammatic layout of tracks and sectors with illustrative defects.
Figure 4B:
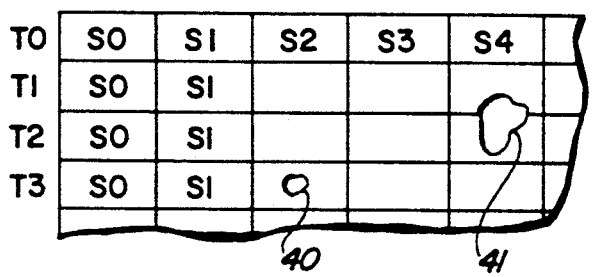

FIGS. 4A and 4B show a diagrammatic layout of tracks and sectors on disk 31. Marks written or read on the disk are typically about one micron in size with a minimum space between marks of about 1 micron. There are typically thousands of marks in a sector along each track. FIG. 4A diagrammatically shows a temporary defect 40 at sector S2 on track T1, and a permanent defect 41 at sector 4 on track T2. These defects may be large enough to prevent accurate data storage and retrieval within these locations. If so, data on these sectors, or data intended for these sectors, are moved to a spare sector.

FIG. 4B is similar to FIG. 4A, and shows what may happen with the two types of defects over the course of time. Note that temporary defect 40 is no longer at sector 2, track 1, but rather has moved to sector 2, track 3. A moving defect, such as defect 40, is due to a dust particle moving across the surface of the disk.

Defect 41 at S4, T2, is a small permanent defect in FIG. 4A and may be too small to cause the loss of any data at the time of initial format. However, FIG. 4B shows that defect 41 has grown in size over the course of time to create a problem in adjacent tracks T1 in sector S4. Growth of defect 41 is typical of defects in the reactive layer of the disk. Since optical disks are used for mass storage they are often expected to last for many years. Such a long length of time creates ample opportunity for the growth of permanent defect 41.

The instant invention is designed to identify sectors that are contaminated by dust, temporary defects, and sectors that are affected by reactive defects. To make that determination, defects are noted when the disk is inserted for the first time into a drive and formatted. In the formatting operation, each and every sector is written and read and thus it can be ascertained at that initial load which sectors are defective. It is assumed that these defective sectors are due to defects in the reactive material rather than dust since the disk is sealed prior to first use. The expectation is that these defects will probably grow over a period of years. Such growth occurs in all directions, that is, a defect will spread along the same track from bit position to bit position, and will also spread out to sectors on adjacent tracks.

As a disk is used over a significant period of time, the number of defective sectors may increase significantly and when a specific threshold is reached, a request can be made for the user to clean the disk. If the disk is installed in a library, the cleaning may be done automatically. After the disk is cleaned, it is then tested to determine if those sectors which were not defective at the initial format and are not adjacent to sectors which were defective at initial format are now testing good. Testing is accomplished by reformatting such sectors.

In a standard disk structure, the Disk Management Area (DMA) is replicated four times, twice in tracks 0, 1, and 2, and twice more in tracks N-2, N-1, and N, where N is the last track in the user zone. Each DMA contains a first sector with a Disk Definition Structure (DDS) and an area containing the Primary Defect List (PDL) and the Secondary Defect List (SDL). The second sector of the DMA is the first sector of the PDL. The length of the PDL is determined by the number of entries in it. The SDL begins in the sector following the last sector of the PDL, and its length is also determined by the number of entries in it. The start address of the PDL and SDL within each DMA is found in the DDS for that DMA.

During the formatting process defective sectors are found and alternate sectors are assigned from the list of spare sectors. The defective sector and replacement sector addresses are stored in the PDL area of the DMA structure in ascending order of sector addresses. It is assumed that prior to the original formatting of a disk the cartridge has been sealed and therefore there has been no dust accumulation.

The addresses of defective sector locations encountered during use are stored in the SDL area in the DMA structure together with the address of their respective associated replacement sectors. Again the defective sector data is stored in ascending order of sector addresses.

Any new errors that occur after format time in areas not associated physically with the errors found at initial format are potentially errors caused by dust particles.

When a disk is loaded into a drive the DMA structure is loaded into RAM. At this point the controller can tally the defective sectors. When a threshold of spare sectors have been used, for example, when 70% of the spare sectors have been used, an error message is generated and sent to the host. The host then sends a "Request Sense" command to the drive and the sense data shows the percent of spares used. If the drive has recognized that a majority of the errors are not associated physically with the errors found at format time it can be concluded that dust is the problem and a request can be issued that the disk be cleaned.

After the disk is cleaned it is inserted into the drive to determine if some of the previously detected bad sectors are now good. This is accomplished by having the host send a "Format" command to the drive with a "Reclaimed Defective Sector" bit on. Only those sectors which were not defective at format time and were not adjacent to defective sectors at format time are reformatted. After reformatting and performing the surface analysis, those sectors which are now good are reclaimed.

There are three techniques for reclaiming the sectors. One is to consider the reclaimed sectors as new spares, the second is to move customer data from the spare area back to the original location on the disk, and the third is to restore the reclaimed sector to the user area for future write operations.

Defining the newly reclaimed sectors as additional spares eliminates the need to move customer data, thereby saving time. This method also fits those applications requiring high data integrity.

Moving data back to the user area from the spare area requires a manipulation of the user data and the SDL sector information. However, this technique is advantageous for applications requiring high performance since the data will now be found at the original location where it was originally intended to be stored.

The third method, restoring the original sector to the user area for future write operations requires the sending of a "Post Cleaning Processing" bit to the drive via a Mode Select command. The drive controller uses the previously declared defective sector on a subsequent write operation. If successful, the drive controller takes the sector out of the defective sector list and frees the spare assigned to this sector. If the write was not successful, the drive continues to use the previously assigned spare sector and the SDL sector is marked to bypass the reclaim attempts on that defective sector on subsequent write operations. This method is advantageous for applications where files are being updated frequently.

With reference to the system shown in FIG. 1, there may be several drives with associated controllers 10 connected on bus 12. Each of the connected drives are initialized to provide a defect threshold as shown in FIG. 5. At step 100 the host issues a mode select command to the device in order to set the defect threshold. At step 101 a query is made as to whether all of the devices on the system have had a threshold set and if not, step 100 is repeated until all devices in the system have been set.

FIG. 6 shows the surface analysis procedure for use in the original formatting process for a new disk. At step 110, the format command is received from the host and at step 111 a variable m is set equal to the number of sectors per disk side. At step 112 all of the sectors on a disk side are erased and at step 113 all of the sectors are written with a specific pattern. At step 114 a variable n is set equal to zero and at step 115 sector zero is read. At step 116 the query is answered as to whether the pattern data which had been written to sector zero read back correctly. If it did then the variable n is set equal to $n+1$ at step 117 and at step 118 the query is asked as to whether all sectors have been read. If not, a return is made to read the next sector at step 115 in order to determine whether the next sector contains a defect. When a defective sector is found at step 116, the address of that sector is stored in RAM at step 119 before a return is made to inspect the next sector. Once the patterns that have been written to all of the sectors have been inspected, the surface analysis is complete.

Figure 7:
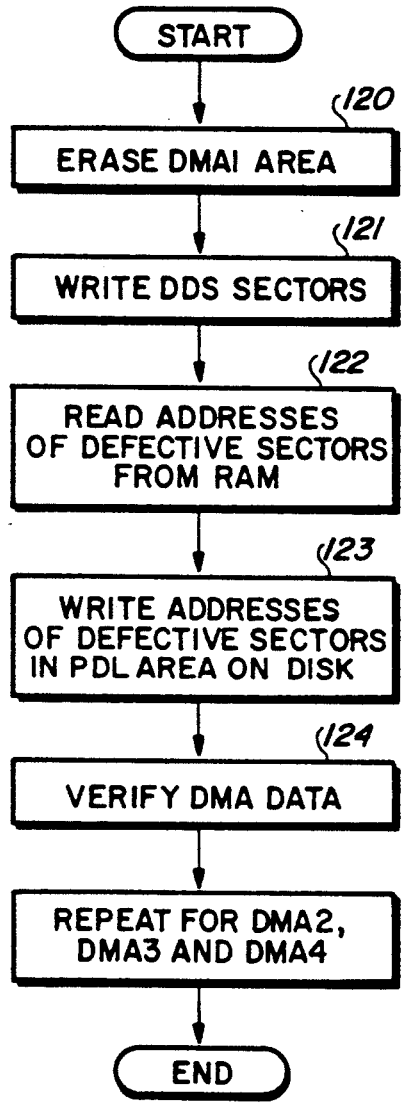
FIG. 7 shows a procedure for setting up a list of defective sectors upon the initial disk format.

The next step for preparing the new disk is to write the disk management area (DMA) as shown in FIG. 7. At step 120 the DMA 1 area is erased and the DDS sector is written at step 121. Next at steps 122 and 123 the defective sector addresses determined and stored at steps 116 and 119, are read out of RAM and written into the PDL area. The DMA data is verified at step 124 and steps 120-124 repeated for DMA areas 2, 3, and 4.

Figure 8:
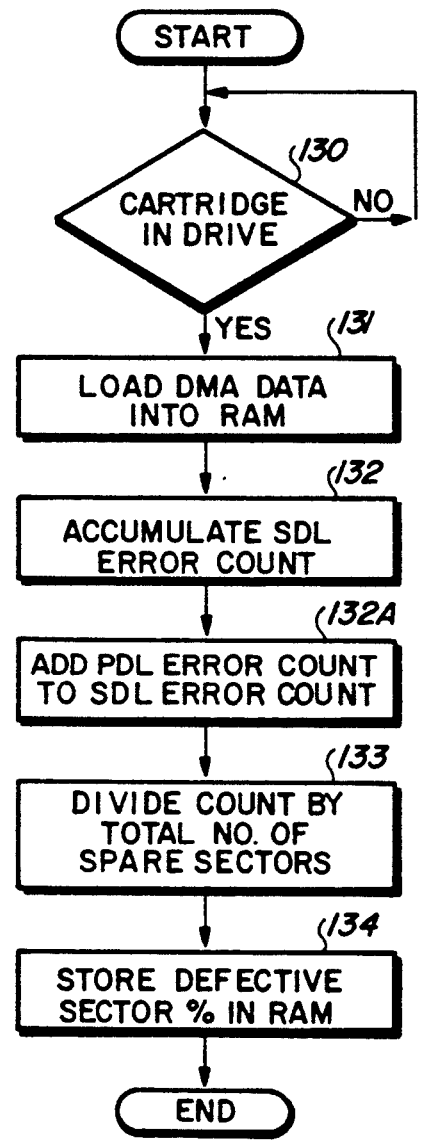
FIG. 8 shows a procedure for determining the percentage of defective sectors for comparison to the threshold found in the procedure of FIG. 5.

FIG. 8 shows the procedure for determining the number of defective sectors as a percentage of spare sectors. At step 130 the cartridge is inserted into the drive and at step 131 the DMA data is loaded into RAM. At step 132 an inspection is made of the error count in the secondary defect list (SDL) and at step 132A that count is added to the number of defective sectors in the PDL. At step 133 that count is divided by the total number of spare sectors available on that particular disk. For example, the number of spare sectors may be 2048. The result of that calculation is stored in RAM at step 134.

Figure 9B:
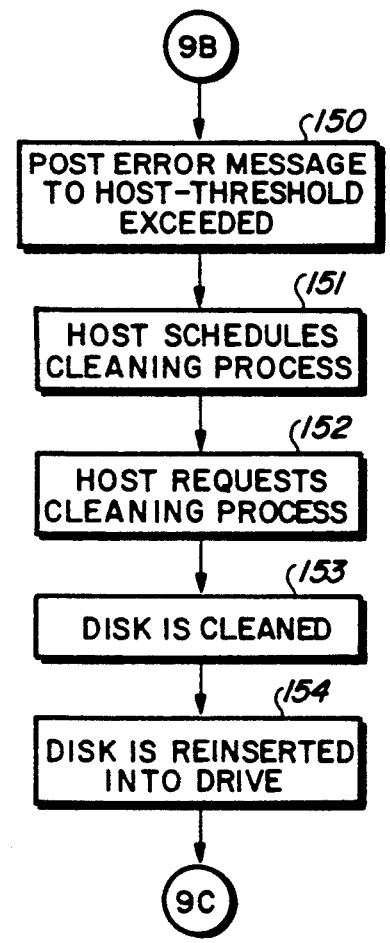
FIG. 9B shows the cleaning process if the number of defective sectors exceeds the threshold.
Figure 9A:
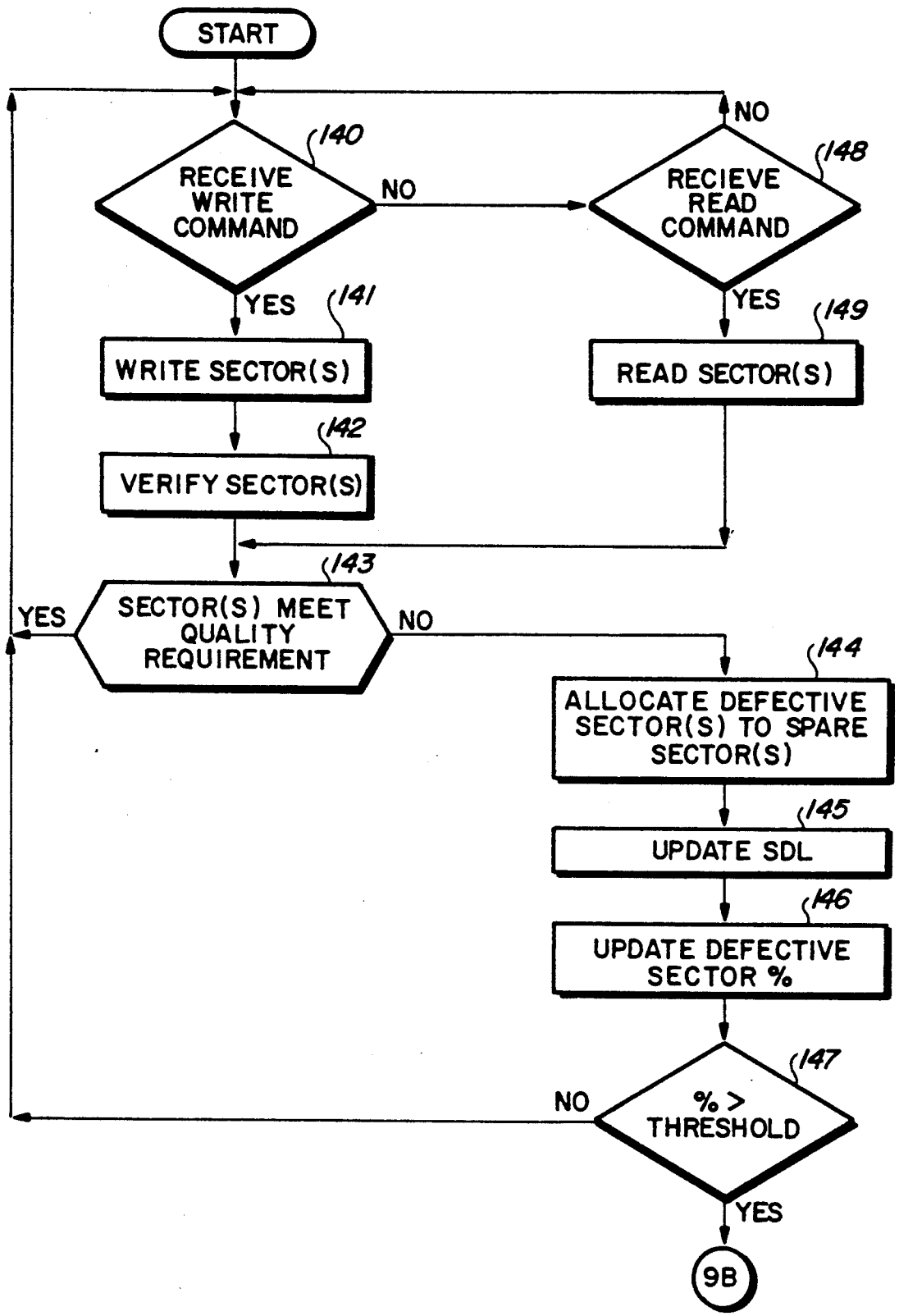
FIG. 9A shows the procedure for determining defective sectors during use of the optical disk.

FIG. 9A shows the procedure for detecting a defective sector. At step 140, if it is determined that a write command has been received the sector is written at step 141 and verified at step 142. If the sector meets the quality requirements for writing the data a return is made to await the next read or write command. However, if at step 143 the quality threshold is not met, then a branch is made to step 144 to write the data in the spare area. Thereupon the secondary defect list (SDL) is updated at step 145 and the percentage of defective sectors is updated at step 146. The query is asked as to whether the percentage of defective sectors is now greater than the threshold allowable. If it is not, a return is made to await the next read or write command. If the threshold is exceeded, a branch is made to the procedure shown in FIG. 9B to provide a notice for activating the disk cleaning process.

It should be noted that at step 143 after the sector had been written it was necessary to determine whether the written sector met a quality requirement of the system. A quality threshold will depend on the number of defects allowed in a sector before declaring the sector defective. The number of defects allowed is dependent upon the error correcting code capability of the system. Generally the quality threshold of a write command will be set at a higher level than that for a read command. That is to say fewer defects are permitted upon writing than upon reading.

If at step 140 it is determined that a write command has not been received, at step 148 it is determined whether the command is a read command. If it is, the sectors are read at step 149 then at step 143 it is determined whether the sector meets the quality requirements for a read command. Generally these requirements are more lenient than they are for a write command. If, however, the quality requirements are exceeded, the data is reallocated to the spare areas and the SDL list is updated. Thereafter the defective sector percentage is updated and that percentage is compared to the threshold to determine whether the number of defective sectors exceeds the permitted maximum. If within the limits, a branch is made to receive the next instruction but if the defective sector threshold has been exceeded a branch is made to the procedure shown on FIG. 9B to provide a notice for activating the disk cleaning process.

Figure 9C:
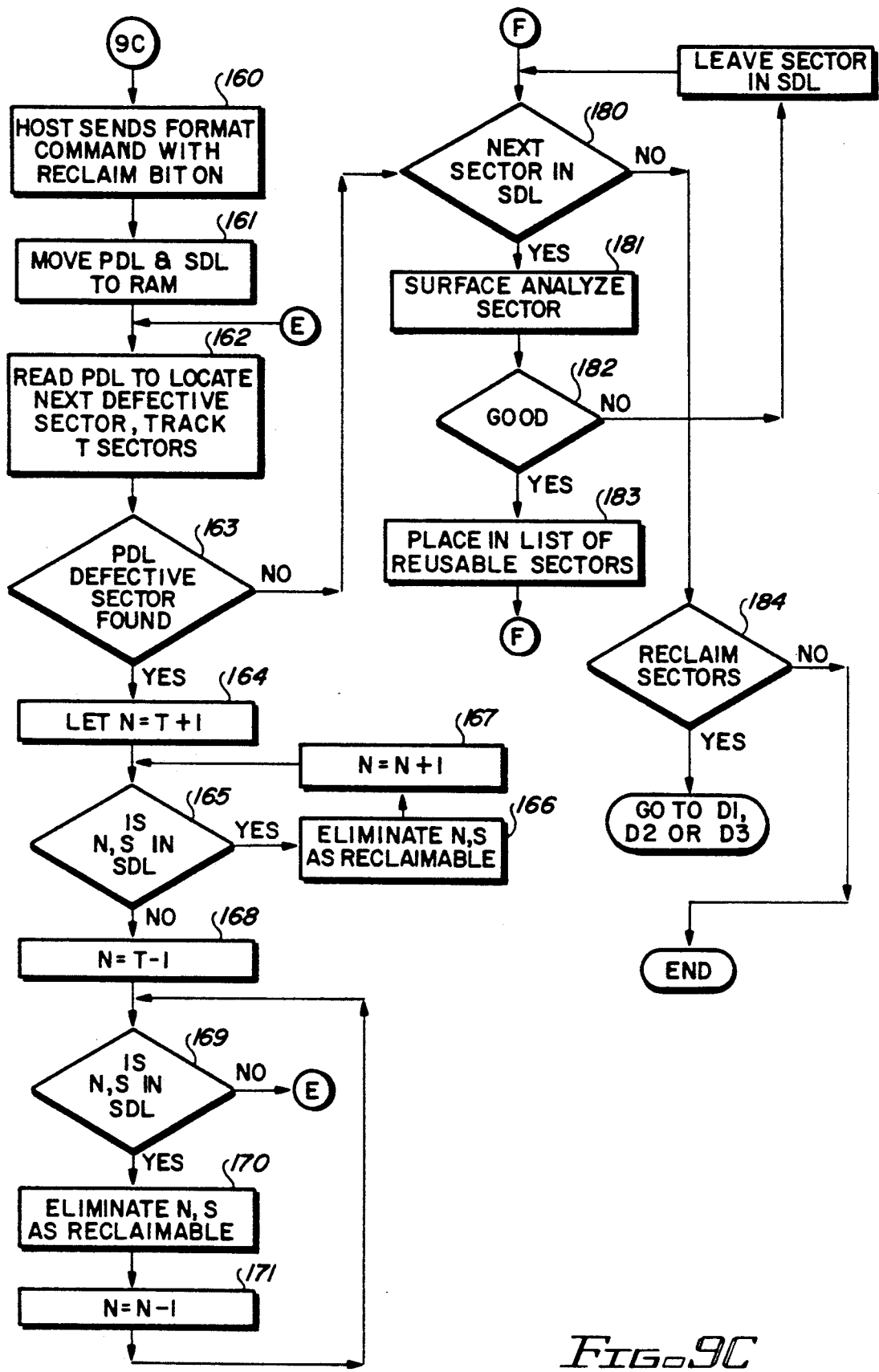
FIG. 9C shows the procedure for determining whether previously defective sectors are reusable after the cleaning operation of FIG. 8.

In FIG. 9B, at step 150 an error message is posted to the host that the threshold has been exceeded and at step 151 the host schedules a cleaning process. At step 152 the request for the cleaning process is issued which can be accomplished by the operator cleaning the disk manually, that is, retrieving it from the drive and placing it in a cleaning station. The process may be done automatically if the disk drives are part of a library containing a cleaning station. In any event, after the disk is cleaned and reinserted in the drive at steps 153 and 154 a branch is made to the sector reclaiming process shown on FIG. 9C.

At step 160 the host sends a format command with the reclamation bit activated to the drive. At step 161 the defect data in the primary defect list (PDL) and the secondary defect list (SDL) are moved to RAM if not already there. At step 162 the next defective sector, in this case the first defective sector in the PDL, track T, sector S is read and if a defective sector is found, at step 164 the variable N is set equal to T+1. The succeeding steps determine whether there is an address in the SDL adjacent to track T and sector S. To do that, at step 165 the query is determined as to whether the address N,S is in the SDL. If that address is present in the SDL, it is eliminated at step 166 as a sector which can be reclaimed. At step 167 the variable N is set equal to N+1 and the process repeats until all adjacent defective sectors have been eliminated as reclaimable possibilities.

If the determination at step 165 is negative (the address N,S is not in the SDL) a branch is made to step 168 where the variable N is set equal to T−1. At step 169 the SDL is inspected to see whether the address N,S is in the SDL. If it is, that address is eliminated as a reclamation possibility at step 170. At step 171 N is set equal to N−1 and the process repeats. All adjacent defective sectors found in the SDL are ultimately eliminated and a branch is made back to step 162 to determine the location of the next defective sector in the PDL and determine whether the SDL has sectors adjacent to that next PDL sector.

Eventually, the PDL list is exhausted as found at step 163 causing a branch to step 180 to ascertain those sectors that are left in the modified SDL list resident in RAM. If there are none, then no reclaimable sectors have been found and the process ends. If one or more sectors remain in the modified SDL list they have been identified as potentially reclaimable sectors. The first sector is surface analyzed at step 181 by writing a pattern on the sector and then reading it back to determine whether the sector is now good. If the sector is good as found at step 182, it is placed in a list of reusable sectors at step 183 and the modified SDL list is inspected to find the next sector to analyze. However, at step 182 if the sector is found still defective that sector is left in the SDL list and the next sector to analyze is identified. The process repeats.

When the modified SDL list is exhausted as found at step 180, the list of reusable sectors is inspected at step 184. If no sectors were identified, the process ends, otherwise a branch is made to FIG. 9D to reclaim the identified reusable sectors according to the chosen option.

Figure 9D:
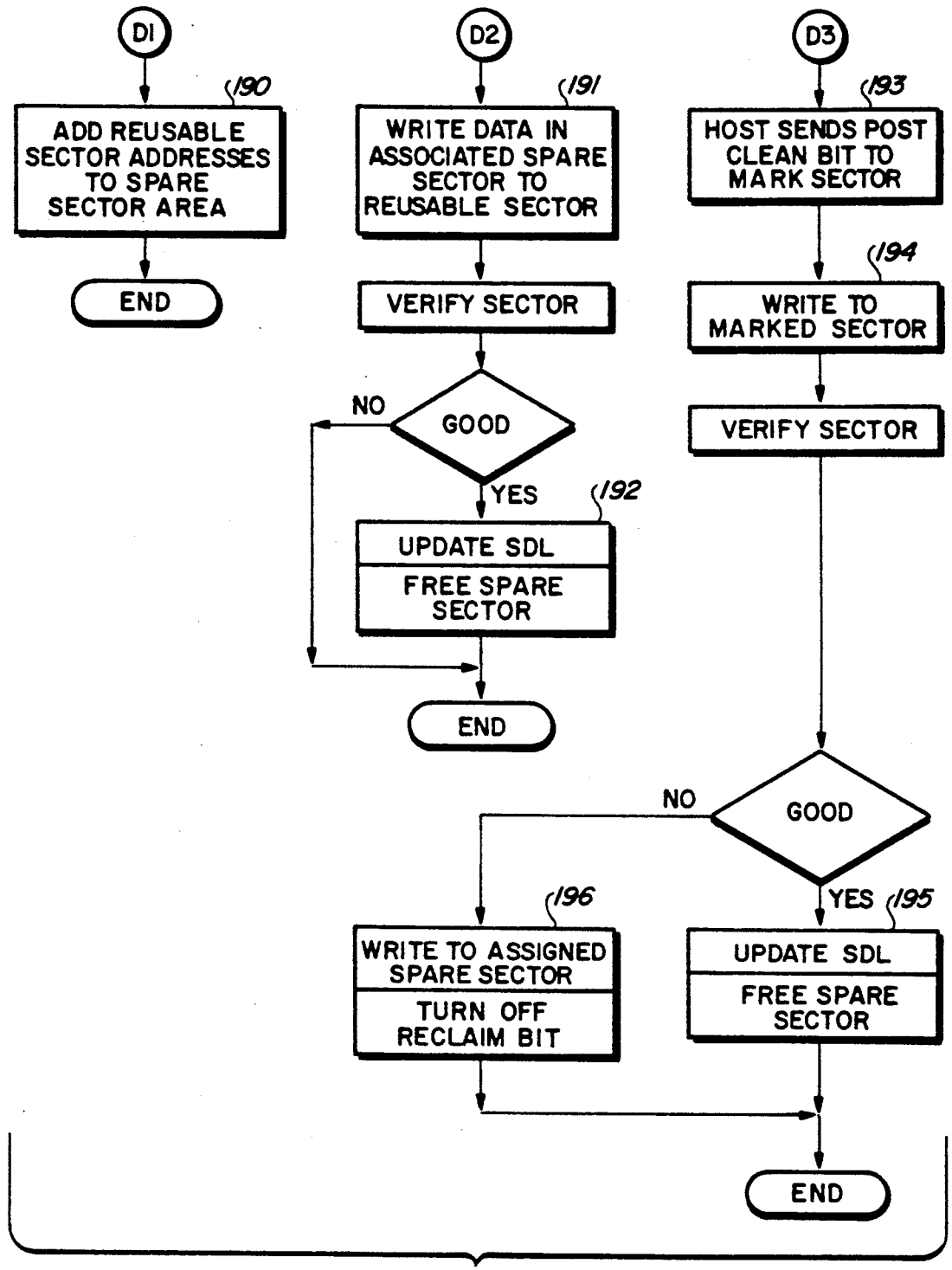
FIG. 9D shows three options for reclaiming the sectors identified as reusable.

In FIG. 9D option 1, at step 190 the sectors which have been declared reusable are deleted from the SDL and added to the spare sector list or area in order that they can be made available for use by the defective sector replacement algorithm.

If option 2 has been selected, at step 191 data is moved from the designated spare sector and written to the newly identified reusable sector. If the writing operation is successful, at step 192 the SDL table is updated and the spare sector previously allocated to the reclaimed sector is made available as a spare sector. If unsuccessful, the SDL remains unchanged.

If option 3 has been selected, at step 193 the host sends a post clean bit to the drive via a mode select command. This marks the sector for reclaim and the drive controller uses the newly reclaimed sector to update data in the assigned spare sector on a subsequent write operation at step 194. If the write operation is successful, at step 195 the sector is taken out of the SDL and the spare previously assigned to that sector is freed. If unsuccessful, at step 196 the updated data is written to the assigned spare sector and the reclaim bit is turned off. The SDL is not changed.

In the case where there are relatively few total sectors on the optical disk, there may be no practical need to inspect the PDL and eliminate SDL sectors adjacent to those in the PDL. In such case, after moving the SDL to the RAM in step 161, FIG. 9C, a branch may be made directly to step 180 to surface analyze all sectors in the SDL.

This invention can also be used for write once disks to alert the user that excessive spare sectors are being consumed. This can occur if the disk becomes dusty during use causing sectors in the user area and the spare area to become contaminated. In the write once case, it is not possible to reclaim defective areas, but it is desirable to alert the user to clean the disk to avoid excessive sector use. This is accomplished through use of the procedures set forth in FIGS. 5, 8, 9A, and 9B only. Obviously, the surface analysis procedure of FIGS. 6 and 7 are inapplicable to write once as are the reclaim procedures in FIGS. 9C and 9D.

In FIG. 5, the mode select command is used to set a desired threshold for the write once disk. That threshold may be significantly different from a desired threshold set for rewriteable disks, since it is not possible to reclaim write once sectors after they have been written.

In FIG. 8, the count of defective sectors is divided by the total number of spare sectors in step 133 and stored at step 134. It is not necessary to perform steps 132 and 133 since there are no separate PDL and SDL lists for write once disks.

In FIG. 9A, the procedure for associating spare sectors with defective sectors is identical to that shown except that step 145 is skipped since there is no SDL. When the percentage of defective sectors exceeds a desired threshold as found at step 147, a branch is made to FIG. 9B to call for a cleaning process for the disk. Once cleaned, excessive use of spare sectors may be halted. The process ends with FIG. 9B since defective sectors are not reclaimable in the write once case.

While the invention has been particularly shown and described with reference to preferred embodiments thereof, it will be understood by those skilled in the art that various changes in form and details may be made therein without departing from the spirit and scope of the invention:

What is claimed is:

1. In optical disk drive apparatus including a controller with a microprocessor and working memory, wherein optical disks for use in said apparatus are formatted with user areas and with available spare sector areas, said spare sector areas providing an assigned spare sector location for recording data when sectors in said user areas are found defective, said optical disk containing defects that are most likely due to permanent defects within the disk itself and temporary defects caused by dust or the like, a method of identifying those sectors containing temporary defects that can be reclaimed, comprising the steps of:
    at the time of an initial disk load into said drive apparatus, formatting all user area sectors on said disk and storing the address of all sectors found defective in a primary defect list (PDL) located on said disk, said PDL thereby containing a list of sectors with permanent defects,
    during subsequent use of said disk, storing the address of all sectors found defective during use in a secondary defect list (SDL) located on said disk,
    setting a threshold of spare sector consumption,
    determining spare sector usage by adding the number of sectors listed in said PDL and the number of sectors listed in said SDL,
    comparing spare sector usage to said threshold, and if said threshold is exceeded requesting a disk cleaning operation, and
    upon reinsertion of a cleaned disk into said drive, inspecting said SDL and reformatting all sectors therein to determine if they are now reusable.

2. The method of claim 1 further including the step of for those sectors identified as reusable, reclaiming the reusable sectors by adding them to the available spare sector area.

3. The method of claim 1 further including the steps of
    for those sectors identified as reusable, reclaiming each reusable sector by writing that data originally intended for it from the assigned spare sector where the data has been located and, if successful, updating the SDL and adding said assigned spare sector to the available spare sector area.

4. The method of claim 1 further including the steps of:
    for those sectors identified as reusable, reclaiming each reusable sector by restoring them to the user area for further write operations and when successfully written, deleting the sector from the SDL and adding the associated spare sector to the available spare sector area.

5. The method of claim 1 wherein said PDL is inspected to identify all sectors listed in said SDL which are adjacent to sectors listed in said PDL, thereupon preparing a modified SDL in working memory in which the addresses of said adjacent sectors are removed from said SDL, thereupon performing the step of reformatting all sectors listed in said modified SDL to determine if they are now reusable.

6. The method of claim 5 further including the step of for those sectors identified as reusable, reclaiming the reusable sectors by adding them to the available spare sector area.

7. The method of claim 5 further including the steps of
    for those sectors identified as reusable, reclaiming each reusable sector by writing that data originally intended for it from the assigned spare sector where the data has been located and, if successful, updating the SDL and adding said assigned spare sector to the available spare sector area.

8. The method of claim 5 further including the steps of:
    for those sectors identified as reusable, reclaiming each reusable sector by restoring them to the user area for further write operations and when successfully written, deleting the sector from the SDL and adding the associated spare sector to the available spare sector area.

9. In optical disk drive apparatus including a controller with a microprocessor and working memory, wherein optical disks for use in said apparatus are formatted with user areas and with available spare sector areas, said spare sector areas providing an assigned spare sector location for recording data when sectors in said user areas are found defective, said optical disk containing defects that are most likely due to permanent defects within the disk itself and temporary defects caused by dust or the like, a method of identifying those sectors containing temporary defects that can be reclaimed, comprising the steps of:
    providing a procedure for formatting all user area sectors on said disk at the time of initial disk load into said drive apparatus and storing the address of all sectors found defective in a primary defect list (PDL) located on said disk, said PDL thereby containing a list of sectors with permanent defects,
    providing a procedure for setting a threshold of spare sector consumption,
    providing a procedure for determining spare sector usage by adding the number of sectors listed in said PDL and the number of sectors listed in said SDL,
    providing a procedure for comparing spare sector usage to said threshold, and if said threshold is exceeded requesting a disk cleaning operation, and
    providing a procedure for inspecting said SDL for a clean disk and reformatting all sectors therein to determine if they are now reusable.

10. The method of claim 9 further including the step of
    providing a procedure for those sectors identified as reusable to reclaim the reusable sectors by adding them to the available spare sector area.

11. The method of claim 9 further including the step of
    providing a procedure for those sectors identified as reusable to reclaim each reusable sector by writing that data originally intended for it from the assigned spare sector where the data has been located and, if successful, updating the SDL and adding said assigned spare sector to the available spare sector area.

12. The method of claim 9 further including the step of
    providing a procedure for those sectors identified as reusable to reclaim each reusable sector by restoring them to the user area for further write operations and when successfully written, deleting the sector from the SDL and adding the associated spare sector to the available spare sector area.

13. The method of claim 9 wherein a procedure is provided to inspect said PDL and identify all sectors listed in said SDL which are adjacent to sectors listed in said PDL, thereupon preparing a modified SDL in working memory in which said adjacent sectors are removed from said SDL, thereupon performing the step of reformatting all sectors listed in said modified SDL to determine if they are now reusable.

14. The method of claim 13 further including the step of
    providing a procedure for those sectors identified as reusable to reclaim the reusable sectors by adding them to the available spare sector area.

15. The method of claim 13 further including the step of
    providing a procedure for those sectors identified as reusable to reclaim each reusable sector by writing that data originally intended for it from the assigned spare sector where the data has been located and, if successful, updating the SDL and adding said assigned spare sector to the available spare sector area.

16. The method of claim 13 further including the step of
    providing a procedure for those sectors identified as reusable to reclaim each reusable sector by restoring them to the user area for further write operations and when successfully written, deleting the sector from the SDL and adding the associated spare sector to the available spare sector area.

17. In optical disk drive apparatus including a controller with a microprocessor and working memory, wherein optical disks for use in said apparatus are formatted with user areas and with available spare sector areas, said spare sector areas providing an assigned spare sector location for recording data when sectors in said user areas are found defective, a method of ascertaining excessive use of spare sectors comprising the machine-implemented steps of:
    setting a threshold of spare sector consumption and storing said threshold in said working memory,
    determining spare sector usage and storing said usage in said working memory, and
    comparing spare sector usage to said threshold, and if said threshold is exceeded, requesting a disk cleaning operation.

18. In optical disk drive apparatus including a controller with a microprocessor and working memory, wherein optical disks for use in said apparatus are formatted with user areas and with available spare sector areas, said spare sector areas providing an assigned spare sector location for recording data when sectors in said user areas are found defective, a method of ascertaining excessive use of spare sectors comprising the machine-implemented steps of:
    providing a procedure for setting a threshold of spare sector consumption and storing said threshold in working memory,
    providing a procedure for determining spare sector usage and storing said usage in said working memory, and
    providing a procedure for comparing spare sector usage to said threshold, and if said threshold is exceeded, requesting a disk cleaning operation.

* * * * *